Aug. 15, 1933.       R. J. DE SHANO           1,922,570
                   AUTOMATIC SAFETY BRAKE
                   Filed April 30, 1932      2 Sheets-Sheet 1
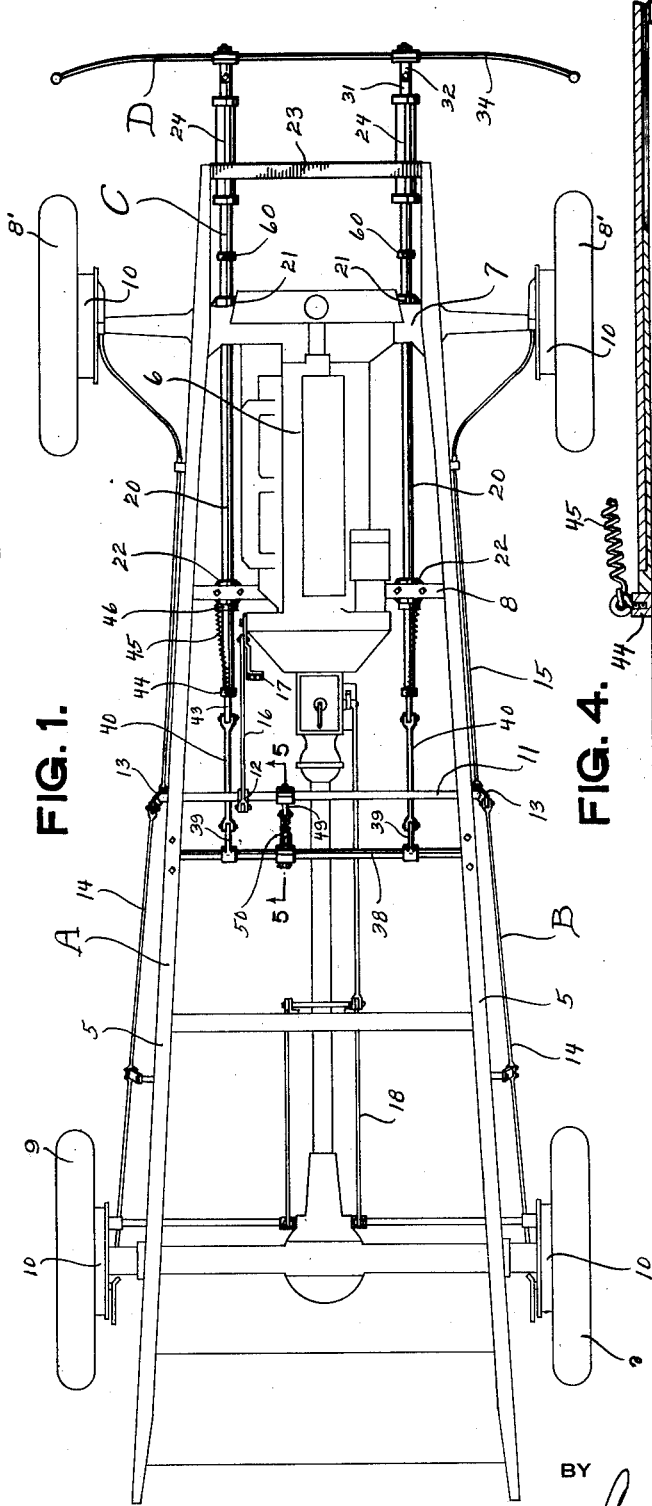
INVENTOR.
Ray J. DeShano
BY
 Lancaster, Allwine & Rommel
                        ATTORNEYS.

Aug. 15, 1933.  R. J. DE SHANO  1,922,570
AUTOMATIC SAFETY BRAKE
Filed April 30, 1932  2 Sheets-Sheet 2
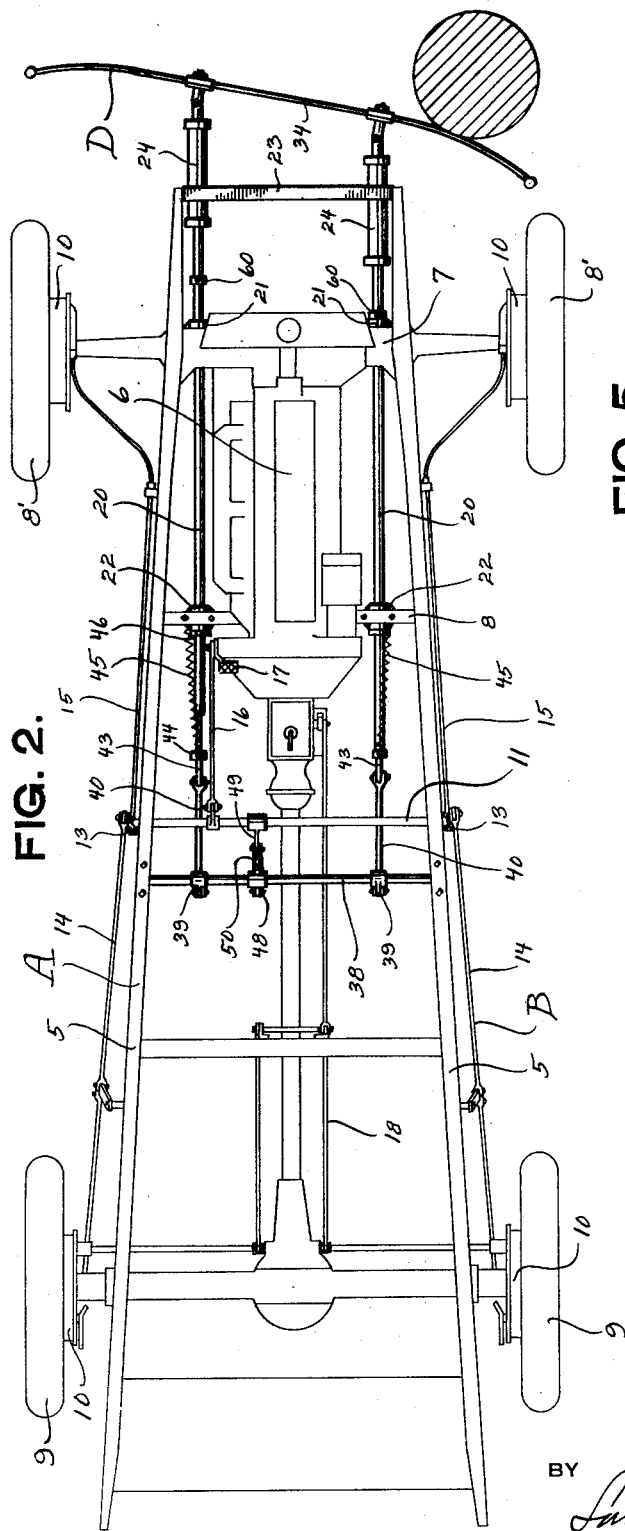
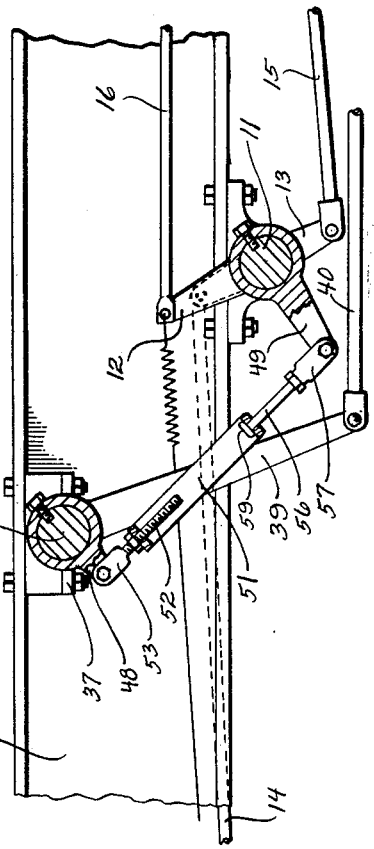
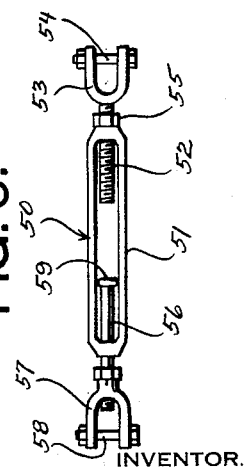
INVENTOR.
Ray J. DeShano
BY
ATTORNEYS.

Patented Aug. 15, 1933

1,922,570

UNITED STATES PATENT OFFICE 1,922,570

AUTOMATIC SAFETY BRAKE

Ray J. De Shano, Wyandotte, Mich.

Application April 30, 1932. Serial No. 608,529

8 Claims. (Cl. 180—83)

The present invention relates to brake mechanism for motor vehicles and the primary object of the invention is to provide an automatic safety brake for motor vehicles actuated by the front bumper of the vehicle to set the brakes upon contact of the bumper with an obstruction.

A further object of the invention is to provide a bumper actuated brake applying means for motor vehicles having a construction whereby the brake will be effectively applied for stopping the vehicle even tho the bumper engages an obstruction adjacent either end of the bumper.

A further object of the invention is to provide an automatic safety brake applying device for motor vehicles embodying a pair of push rods which may be independently or jointly operated for applying the brake regardless of the point along the bumper engaged by an object in the path of travel of the vehicle.

A still further object of the invention is to provide a brake applying device of this character which may be readily applied to existing forms of vehicle construction and embodying adjustable means permitting usual operation of the service brake without interfering with the safety brake mechanism.

Other objects and advantages of the invention will be apparent during the course of the following detailed description, taken in connection with the accompanying drawings forming a part of this specification and in which drawings:

Figure 1 is a top plan view of a motor vehicle chassis having the automatic safety brake device applied thereto.

Figure 2 is a view similar to Figure 1 and showing the manner in which the brake may be applied when an obstruction is engaged by one end portion of the bumper.

Figure 3 is an enlarged fragmentary sectional view taken thru the forward end of one of the push rods, showing the shock absorbing means and manner of attachment to the bumper.

Figure 4 is a fragmentary sectional view at the rear end of one of the push rods and showing the sliding joint permitting independent actuation of the regular brake means.

Figure 5 is an enlarged fragmentary detail view substantially on the line 5—5 of Figure 1 and showing the manner of connecting the safety brake means to the regular brake means of the vehicle.

Figure 6 is an enlarged plan view of the coupling device.

Referring to the drawings in detail and wherein similar reference characters designate corresponding parts thruout the several views, the letter A designates a motor vehicle chassis provided with the usual brake means or mechanism B, while C designates the automatic safety brake mechanism for automatically actuating the brake mechanism B when an object is engaged by the bumper D.

The chassis A comprises the usual frame including the side rails or channels 5 between the forward portions of which the engine 6 is mounted as upon the usual front and rear mounting rails 7 and 8 respectively. The vehicle frame is mounted upon the front and rear ground wheels 8' and 9 respectively each of which is provided with the usual brake drum 10 comprising the usual brake devices operated by the means B.

The service brake means generally designated by the letter B includes the usual transverse brake shaft 11 provided between the frame rails 5 with the usual crank or operating lever 12. Fixed upon each end of the brake shaft 11 are the cranks 13 to the upper ends of which are connected the forward ends of rear pull rods 14 and to the lower ends of which are attached the rear ends of front pull rods 15. The pull rods 14 actuate the service brakes of the rear wheels 9 while the pull rods 15 actuate the brakes of the front wheels 8'. Connected to the upper end of the operating lever 12 is the service brake rod 16 which connects with the service brake pedal 17 whereby upon forward pressure upon the pedal 17 the brake shaft 11 will be rocked in a clockwise direction, considering Figure 5, and exert a pull upon the pull rods 14 and 15 for applying the brakes to the vehicle wheels. As in usual brake constructions, the emergency brake means 18 operates independent of the service brake means B.

Referring now to the safety brake means C, the same is operatively connected to actuate the service brake means B when the bumper D engages an obstruction at any point thruout the length thereof. The device C comprises a pair of tubular push rods 20 mounted for sliding movement longitudinally of the vehicle chassis in front and rear sleeve bearings 21 and 22 respectively. These sleeve bearings 21 and 22 are suitably mounted upon the motor mounting rails 7 and 8 and the push rods extend in parallel relation inwardly of the chassis side rails 5. Connecting the forward ends of the frame rails 5 is a cross brace 23 for slidably supporting tubular housings 24 co-axially of the tubular push rods 20. Slidably fitting in the forward end of each tubular push rod 20 is a plunger rod 25 having a reduced threaded forward end portion 26. The tubular housings 24 are preferably of greater internal diameter than the external diameter of the push rods 20 and preferably have screw threaded ends for receiving front and rear caps 27 and 28 respectively. The forward ends of the push rods 20 are screw threaded for threaded reception of guide bushings 29, with each rear guide bushing forming a stop engageable by the rear cap 28 for limiting forward sliding movement of the tubular housing on the push rod. Encircling each plunger rod 25 within its housing 24 is an expansion coil spring 30 which acts between the foremost of the guide bushings 29 and the front housing cap 27 to normally urge the housing forwardly. Threaded upon the forward end portion 26 of each plunger rod 25 into engagement with the front housing cap 27 is a bumper mounting block 31 having an apertured extension at its forward end for receiving the forked rear end of a hinge member 32 having a shank portion 33 for mounting of the bumper 34 as by suitable clamps 35. The bumper 34 may be of the two bar type and extends transversely of the vehicle in parallel relation to the front cross brace 23. The members 31 and 32 are pivotally connected by a pivot bolt 36 and these vertically disposed pivot bolts will permit the bumper to move rearwardly at either end as shown in Figure 2 without a binding action.

Mounted transversely of the vehicle frame in suitable bearings 37 carried by the frame rails 5, and in the example shown, rearwardly of and parallel to the transverse brake shaft 11, is a rock shaft 38. Secured to the rock shaft 38 is a pair of depending crank arms 39 to the lower ends of which are pivotally connected the rear ends of links 40 which extend forwardly in substantial alignment with the rear ends of the tubular push rods 20.

Arranged in the rear end of each tubular push rod 20 is a bushing 42 having an enlarged outer end abutting the end of the push rod to limit inward movement of the bushing. Pivotally connected to the forward end of each link 40 is a slide rod 43 which telescopically fit into the bushings 42. Carried by each of the slide rods 43 is an adjustable stop collar 44 adapted to abut with the rear end of the bushing 42. A pull back spring 45 connects each stop collar 44 with the rear mounting rail 8 and normally exerts a forward pull upon the stop collar. A stop 46 carried by each tubular push rod 20 abuts with the rear side of the sleeve bearing 22 for limiting forward sliding movement of the push rods by the pull back springs 45. Thus, the pull back springs 45 normally hold the collars 44 in engagement with the rear ends of the push rod bushings 42, exerting a forward pressure on the push rods, and also normally urge the crank arms 39 forwardly.

Referring particularly to Figures 5 and 6, the rock shaft 38 is provided with a short crank arm 48, while a crank arm 49 is affixed at one end to the brake shaft 11 and projects downwardly therefrom forwardly of the rock shaft. An adjustable coupling 50 is provided for connecting the crank arms 48 and 49 in a manner whereby the foot brake may be freely operated without interference from the bumper actuated means for applying the brake. This adjustable coupling 50 comprises an elongated open body portion 51 having a screw threaded opening at one end for threaded reception of the threaded shank 52 of a clevis 53 adapted for pivotal connection to the lower end of the crank arm 48 as by the pin 54. A jam nut 55 is turned into engagement with the end of the body portion 51 to adjustably hold the body portion against rotation after proper adjustment of the length of the coupling. The opposite end of the body portion is provided with a plain opening for slidably receiving a sliding bolt 56 provided with a clevis 57 for pivotal connection to the lower end of the crank arm 49 as by the pin 58. The sliding bolt 56 is provided at its end with an enlargement or head 59 forming a stop adapted to abut the end of the body portion 51. By observing Figure 5, it will be seen that when the brake shaft 11 is rotated in a clockwise direction by the service brake rod 16, the shank of the sliding bolt 56 is permitted to slide into the body portion 51 so that the foot brake may be applied without interference from the safety brake device.

Each tubular push rod 20 is provided adjacent its forward end with a stop collar 60 adapted to abut with the front sleeve bearing 21 and limit rearward sliding of the push rod.

In the operation of the safety brake device for automatically applying brakes when the bumper engages an obstruction during forward travel of the vehicle, one or both of the push rods 20 are moved longitudinally in a rearward direction and thru the coupling means between the push rods and brake shaft 11, applies a braking action to the ground wheels 8' and 9 thru the service brake operating means of the vehicle. When the bumper D strikes an object, the initial shock will be absorbed by the coil springs 30 and the push rods 20, provided the object engages the center portion of the bumper, will be forced rearwardly and thru the links 40, crank arm 39 and 48 exerts a pull upon the coupling 50 and rocks the brake shaft 11 in a like direction as if the brake shaft were rocked by the brake pedal 17 for applying the brakes. Should the object be engaged by one end portion of the bumper as illustrated in Figure 2, the pivotal connection of the bumper to the plunger rods 25 will allow for one of the push rods to be moved and the brakes actuated in the same manner as tho both of the push rods were forced rearwardly. The sliding movement of the rods 43 in the rear ends of the tubular push rods permits operation of the brakes by rearward movement of either of the push rods. Should the bumper engage the object with such force as to move one or both of the stops 60 into engagement with the sleeve bearings 21, the springs 30 will be compressed and act as shock absorbing means to prevent buckling of the push rods or injury to the coupling means between the push rods and brake shaft.

Thus it will be seen that a safety brake has been provided wherein the vehicle brakes will be automatically applied when the bumper engages an obstruction, and regardless of whether the obstruction is engaged by either end portion of the bumper. This is accomplished by the pivotal mounting of the bumper to the push rods and the sliding joint arrangement between the push rods and brake shaft operating means.

Changes in detail may be made to the form of invention herein shown and described, without departing from the spirit of the invention or the scope of the following claims.

I claim:

1. In automatic brake applying means for motor vehicles, brake operating means including a transverse brake shaft, push rods mounted for independent sliding movement longitudinally of the motor vehicle, cushioning means at the forward end of each push rod, a bumper, means pivotally connecting the push rods at their forward ends to the bumper, coupling means between the rear end of each push rod and the brake shaft including slide rods having limited telescoping movement into the rear ends of the push rods, and spring means normally urging the push rods forwardly and the coupling means to a brake releasing position.

2. In automatic brake applying means for motor vehicles, the combination with the brake shaft of the vehicle, of a pair of push rods mounted for sliding movement longitudinally of the motor vehicle, a bumper, means pivotally mounting the bumper upon the forward ends of the push rods, a rock shaft mounted parallel to the brake shaft, a coupling means between the rear end of each push rod and the rock shaft, and adjustable coupling means between the rock shaft and brake shaft for imparting movement to the brake shaft upon rearward movement of either one or both of the push rods by the bumper.

3. In automatic brake applying means for motor vehicles, brake operating means including a transverse brake shaft, a pair of push rods guided for sliding movement longitudinally of the motor vehicle, a bumper, means pivotally supporting the bumper upon the forward ends of the push rods, a rock shaft mounted parallel to the brake shaft, coupling means between the rear end of each push rod and the rock shaft for actuating the rock shaft upon rearward movement of the push rods, and adjustable coupling means between the rock shaft and brake shaft embodying a sliding joint permitting actuation of the brake shaft independently of the rock shaft.

4. In automatic brake applying means for motor vehicles, brake operating means including a transverse brake shaft, a pair of push rods slidably guided for movement longitudinally of the motor vehicle, a plunger rod telescopically associated with the forward end of each push rod, a coupling block secured to the forward end of each plunger rod, a coil spring encircling each plunger rod between the forward ends of the push rods and mounting block, a tubular housing for each spring, a hinge member pivoted to each mounting block, a bumper supported by the hinge members, and coupling means between the rear ends of the push rods and the brake shaft for actuating the brake shaft by rearward movement of either one or both of the push rods by said bumper.

5. In an automatic safety brake for motor vehicles, the combination with a motor vehicle frame including side rails and brake operating means including a transverse brake shaft, a pair of push rods mounted in parallel relation between the rails for longitudinal sliding movement, a cross brace connecting the forward ends of the rails, a tubular housing slidable thru each end portion of the cross brace and telescopically receiving at their rear ends the forward ends of the push rods, a plunger rod in each tubular housing and slidably fitting into the forward ends of the push rods, a coil spring encircling each plunger rod between the forward ends of the push rods and the forward ends of the tubular housings, a bumper, coupling means pivotally connecting the forward ends of the plunger rods to the bumper, means normally urging the plunger rods forwardly, and coupling means between the rear ends of the push rods and the brake shaft for actuating the brake shaft upon rearward movement of either one or both of the push rods.

6. In automatic brake applying means for motor vehicles including brake operating means having a transverse brake shaft, a pair of independently movable push rods mounted for sliding movement longitudinally of the vehicle, a bumper, means pivotally connecting the forward ends of the pushrods to the bumper, a rock shaft mounted parallel with the brake shaft, a pair of crank arms on the rock shaft, a slide rod telescopically associated with the rear end of each push rod, links connecting the slide rods with the crank arms, a stop collar secured to each slide rod, a pull back spring connected to each collar and normally urging the collars into engagement with the rear ends of the push rods, and adjustable coupling means between the rock shaft and brake shaft for operating the brake shaft from the push rods.

7. In automatic brake applying means for motor vehicles having brake operating means including a transverse brake shaft, a pair of independently movable push rods mounted for sliding movement longitudinally of the vehicle, a bumper, means pivotally connecting the forward ends of the push rods to the bumper, spring means normally urging the push rods forwardly, a rock shaft mounted parallel to the brake shaft, coupling means between the rear ends of the push rods and the rock shaft for actuating the rock shaft upon rearward movement of the push rods, a crank arm carried by the brake shaft, a crank arm carried by the rock shaft, and adjustable coupling means between the crank arms for imparting movement to the brake shaft upon rearward movement of the push rods and permitting actuation of the brake shaft independent of the rock shaft.

8. In automatic brake applying means for motor vehicles having brake operating means including a transverse brake shaft, a pair of independently movable push rods mounted for sliding movement longitudinally of the vehicle, a bumper, means pivotally connecting the forward ends of the push rods to the bumper, spring means normally urging the push rods forwardly, a rock shaft mounted parallel to the brake shaft, coupling means between the rear ends of the push rods and the rock shaft for actuating the rock shaft upon rearward movement of the push rods, a crank arm carried by the brake shaft, a crank arm carried by the rock shaft, and adjustable coupling means between the crank arms comprising an elongated coupling member having axially aligning plain and screw threaded openings, a clevis connected with the rock shaft crank arm and having a threaded shank portion for threaded engagement in the threaded opening of the coupling member, a jam nut on the shank portion for binding engagement with the coupling member, a clevis connected with the brake shaft crank arm and having a plain shank portion slidable in the plain opening of the coupling member, and a head formed at the inner end of the plain shank for engagement with the end of the coupling member having the plain opening, said coupling means permitting actuation of the brake shaft independent of the rock shaft.

RAY J. DE SHANO.